US012337736B1

(12) United States Patent
Dabrowski et al.

(10) Patent No.: US 12,337,736 B1
(45) Date of Patent: Jun. 24, 2025

(54) MODAL BLOCK FOR ADJUSTING NATURAL FREQUENCY OF VEHICLE SEAT

(71) Applicant: GM GLOBAL TECHNOLOGY OPERATIONS LLC, Detroit, MI (US)

(72) Inventors: Eryk Jerzy Dabrowski, Bloomfield Hills, MI (US); Chung-long Lu, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 6 days.

(21) Appl. No.: 18/393,619

(22) Filed: Dec. 21, 2023

(51) Int. Cl.
*B60N 2/00* (2006.01)
*B60N 2/07* (2006.01)
*B60N 2/54* (2006.01)

(52) U.S. Cl.
CPC ............ *B60N 2/54* (2013.01); *B60N 2/0722* (2013.01); *B60N 2/0705* (2013.01)

(58) Field of Classification Search
None
See application file for complete search history.

(56) References Cited

U.S. PATENT DOCUMENTS

| 10,363,839 B2* | 7/2019 | Fukuda | B60N 2/08 |
| 11,731,536 B2* | 8/2023 | Hwang | B60N 2/0715 |
| | | | 248/429 |
| 2004/0159763 A1* | 8/2004 | Mullinix | B60N 2/508 |
| | | | 248/421 |
| 2017/0305305 A1* | 10/2017 | Flick | B60N 2/0818 |
| 2019/0061566 A1* | 2/2019 | Tsuji | B60N 2/067 |

FOREIGN PATENT DOCUMENTS

| DE | 02013208003 A1 | 10/2014 |
| JP | S54113198 A | 9/1979 |
| JP | 2016130056 A | 7/2016 |

OTHER PUBLICATIONS

Department of Defense Test Method Standard, Environmental engineering considerations and laboratory tests, Norm MIL-STD-810H w/Change 1 Method 514.8 Annex A, May 18, 2022, paragraph 514.8; http://assist.dla.mil.

* cited by examiner

*Primary Examiner* — Steven M Marsh
(74) *Attorney, Agent, or Firm* — Lorenz & Kopf LLP

(57) ABSTRACT

Vehicles, vehicle seat arrangements, and methods for manufacturing modal blocks for use with vehicle seats in vehicles are provided. A method for manufacturing a modal block for use with a vehicle seat in a vehicle includes identifying a frequency range of output frequencies of the vehicle; determining a natural frequency of the vehicle seat; designing a modal block configured to adjust the natural frequency of the vehicle seat; and locating the modal block between the vehicle and the vehicle seat to adjust the natural frequency of the vehicle seat.

20 Claims, 5 Drawing Sheets

MODAL BLOCK FOR ADJUSTING NATURAL FREQUENCY OF VEHICLE SEAT

INTRODUCTION

The technical field generally relates to vehicle seats, and more particularly relates to a modal block for adjusting the natural frequency of a vehicle seat which also impacts the amplitude and mode shape of the system as a response.

Contemporary automobiles offer a range of amenities designed to enhance the comfort of their occupants. Examples of these features include adjustable seats that can be customized to accommodate specific occupants, including adjustments for longitudinal position, seat height, recline angle, lumbar support, and headrest height.

Often, adjustment of the longitudinal position of a vehicle seat in the fore and aft directions is provided by sliding the seat along a vehicle base track from one fixed position to another. In such an arrangement, there is typically some freeplay or leeway between the vehicle base track and a rail connected to the vehicle seat. The vehicle seat has a natural frequency, i.e., a frequency or rate at which the seat vibrates naturally when disturbed. When the natural frequency of a vehicle seat matches a frequency emitted by another vehicle component, such as an internal combustion engine component of the vehicle or the tires of the vehicle, then the vehicle seat may resonate or vibrate at that frequency during operation of the vehicle.

Accordingly, it is desirable to provide modal blocks and methods for manufacturing modal blocks for adjusting the natural frequency of vehicle seats. Furthermore, other desirable features and characteristics of the present disclosure will become apparent from the subsequent detailed description and the appended claims, taken in conjunction with the accompanying drawings and the foregoing introduction.

SUMMARY

In one embodiment, a method for manufacturing a modal block for use with a vehicle seat in a vehicle is provided. The method includes identifying a frequency range of output frequencies of the vehicle: determining a natural frequency of the vehicle seat: designing a modal block configured to adjust the natural frequency of the vehicle seat; and locating the modal block between the vehicle and the vehicle seat to adjust the natural frequency of the vehicle seat.

In certain embodiments, the method may further include mounting a vehicle base track to the vehicle, and interconnecting the modal block between the vehicle and the vehicle seat includes disposing the modal block between the vehicle base track and the vehicle seat.

In certain embodiments, the method may further include coupling a seat rail to the vehicle seat, and interconnecting the modal block between the vehicle and the vehicle seat includes disposing the modal block between the vehicle base track and the seat rail.

In certain embodiments of the method, the seat rail is configured to slide in a longitudinal direction between fixed positions with respect to the vehicle base track, and wherein the modal block is fixed in position on the vehicle base track.

In certain embodiments of the method, when the natural frequency is within the frequency range, designing the modal block configured to adjust the natural frequency of the vehicle seat includes adjusting the natural frequency of the vehicle seat to an adjusted natural frequency outside of the frequency range.

In certain embodiments of the method, when the natural frequency is within the frequency range, designing the modal block configured to adjust the natural frequency of the vehicle seat includes increasing the natural frequency of the vehicle seat to an increased natural frequency outside of the frequency range.

In certain embodiments of the method, designing the modal block configured to adjust the natural frequency of the vehicle seat includes decreasing an amplitude at the natural frequency.

In certain embodiments of the method, designing the modal block configured to adjust the natural frequency of the vehicle seat includes changing a mode shape of the vehicle seat.

In another embodiment, a vehicle seat arrangement is provided and includes a vehicle seat: a vehicle base track: a seat rail mounted to the vehicle seat and configured for movement with respect to the vehicle base track; and a modal block disposed between the vehicle base track and the seat rail, wherein the modal block is configured to adjust a natural frequency of the vehicle seat arrangement.

In certain embodiments of the vehicle seat arrangement, the modal block is configured to increase the natural frequency of the vehicle seat arrangement to a desired adjusted natural frequency.

In certain embodiments of the vehicle seat arrangement, the modal block is configured to increase the natural frequency of the vehicle seat arrangement in a longitudinal direction.

In certain embodiments of the vehicle seat arrangement, the modal block is configured to increase the natural frequency of the vehicle seat arrangement in a lateral direction.

In certain embodiments of the vehicle seat arrangement, the modal block is configured to dampen vibration of the vehicle seat arrangement.

In certain embodiments of the vehicle seat arrangement, the modal block includes a base disposed on a bottom portion of the vehicle base track: a shoulder portion located above the base and having a surface located under the seat rail; and an upper portion located inside the seat rail.

In certain embodiments of the vehicle seat arrangement, the shoulder portion contacts the seat rail and is configured to increase the natural frequency of the vehicle seat arrangement in a longitudinal direction.

In certain embodiments of the vehicle seat arrangement, the upper portion is formed with outward extending projections that contact the seat rail and are configured to increase the natural frequency of the vehicle seat arrangement in a lateral direction.

In certain embodiments of the vehicle seat arrangement, the modal block is fixed in position, and wherein the vehicle seat and seat rail are configured for movement in a longitudinal direction to adjust a location of the vehicle seat.

In another embodiment, a vehicle is provided and includes a vehicle body: a vehicle base track coupled to the vehicle body: a seat rail mounted to a seat and configured for movement with respect to the vehicle base track; and a modal block disposed between the vehicle base track and the seat rail, wherein the modal block is configured to adjust a natural frequency of the seat.

In certain embodiments of the vehicle, the modal block includes: a base disposed on a bottom portion of the vehicle base track: a shoulder portion located above the base and having a surface located under the seat rail; and an upper portion located inside the seat rail.

In certain embodiments of the vehicle, the shoulder portion contacts the seat rail and is configured to increase the natural frequency of the seat in a longitudinal direction; and/or the upper portion is formed with outward extending projections that contact the seat rail and are configured to increase the natural frequency of the seat in a lateral direction.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses of embodiments herein. Furthermore, there is no intention to be bound by any expressed or implied theory presented in the preceding introduction, brief summary or the following detailed description.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Embodiments herein are provided to improve vehicle seat performance and endurance in view of output frequencies produced by the vehicle. Seat mechanisms have inherent freeplay in order to guarantee functionality and range adjustment. However, freeplay has a negative effect of modal performance and can impact the amplitude of vibration. Freeplay also affects the modal "shape" making attenuation of freeplay difficult to offset.

Embodiments herein provide for the addition of support features, i.e. modal blocks, into the seat mechanism in order to control the behavior or decrease the freeplay in the system. The modal block supports the components moving relative to each other in order to stabilize the mechanism. The modal blocks may provide additional support to improve modal performance. The modal blocks may improve (decrease) amplitude. The modal blocks may change mode "shape." As described herein, the modal blocks may be made of any material and may be a combination of materials depending on the end goal. Further, the modal blocks may be attached in any way, i.e., via mechanical coupling, friction, adhesive, or other suitable manner, to support the seating mechanism features.

Figure 1:
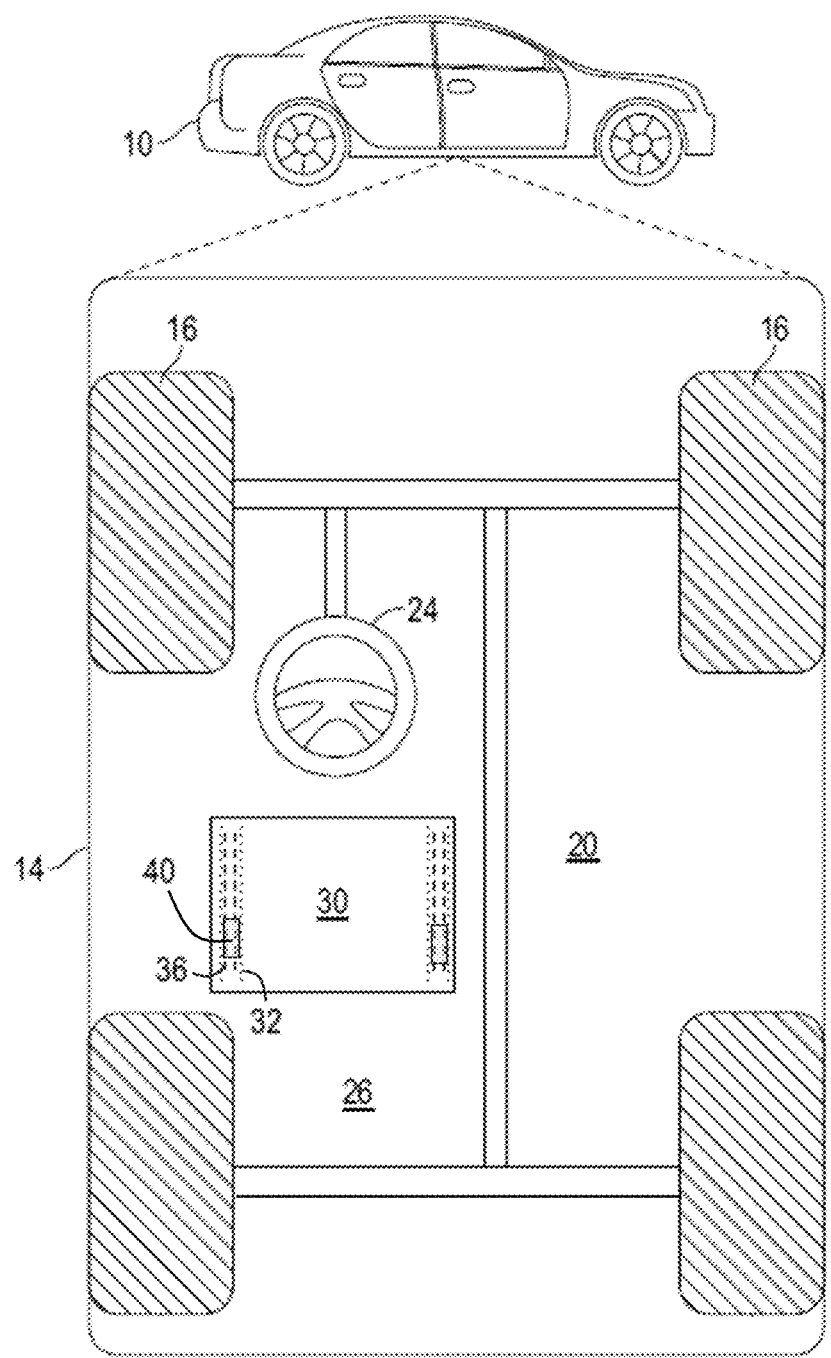
FIG. 1 is functional block diagram of a vehicle including a seat with a modal block in accordance with an example.

With reference to FIG. 1, certain features of a vehicle 10 are illustrated in functional block diagram form. In certain examples, the vehicle 10 comprises an automobile. In various examples, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles or mobile platforms in certain examples.

As depicted in FIG. 1, the exemplary vehicle 10 generally includes a body 14 and wheels 16. The body 14 substantially encloses components of the vehicle 10. The body 14 may define an internal cabin 20 having a cabin floor 26. The wheels 16 are each rotationally coupled to the vehicle 10 near a respective corner of the body 14.

The vehicle 10 further includes a steering wheel 24 and a vehicle seat 30 distanced from the steering wheel 24 in a longitudinal direction. As indicated, vehicle base tracks 32 may be mounted to the cabin floor 26. Further, seat rails 36 may be coupled to the seat 30 and may be cooperate with the vehicle base tracks 32 for provide for sliding engagement between the seat 30 and the cabin floor 26 of the vehicle 10. As shown, a modal block 40 may be provided at a desired location between a vehicle base track 32 and a seat rail 36. Depending on the desired effect, a modal block 40 may be provided at only one set of a vehicle base track 32 and a seat rail 36 per seat 30, or at both sets of vehicle base tracks 32 and seat rails 36 per seat 30. Further, more than one modal block 40 may be provided between a vehicle base track 32 and a seat rail 36. The vehicle 10 may further include a motor, not shown, for adjusting the position of the seat 30 in the longitudinal direction, i.e., in an aft or fore direction between a front and a rear of the vehicle 10.

Figure 2:
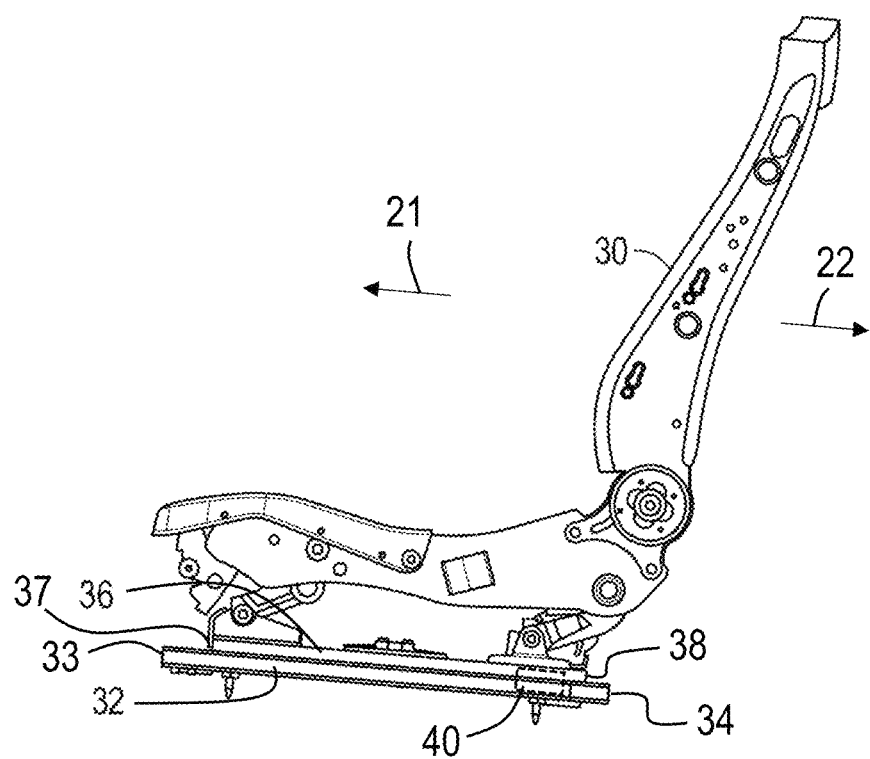
FIG. 2 is a side view of the vehicle seat, seat rail, and vehicle bask track of FIG. 1, in accordance with exemplary embodiments.

FIG. 2 illustrates the engagement and positioning of the seat 30, seat rail 36, and vehicle base track 32.

As shown in FIG. 2, the vehicle base track 32 extends from a front end 33 to a rear end 34. Further, the seat rail 36 extends from a front end 37 to a rear end 38. The seat 30 and seat rail 36 may move in a forward direction 21 to the front end 33 or in a rearward direction 22 to the rear end 34.

The modal block 40 is hidden in the view of FIG. 2.

Figure 3:
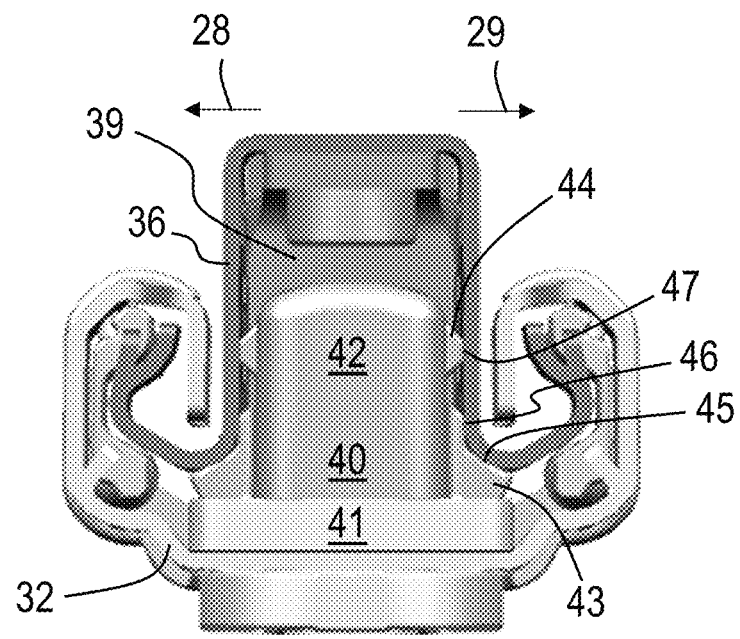
FIG. 3 is an end view of the seat rail and vehicle base track of FIGS. 1 and 2 in engagement with a modal block, in accordance with exemplary embodiments.
Figure 4:
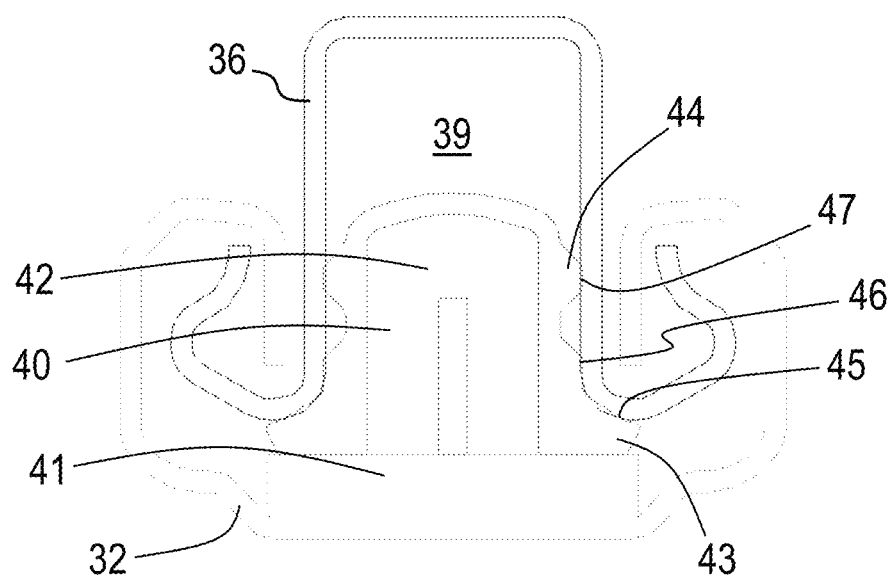
FIG. 4 is a section view of the seat rail, vehicle base track, and modal block of FIG. 3, in accordance with exemplary embodiments.

FIG. 3 is an end view illustrating a modal block 40 disposed between a base track 32 and a seat rail 36, such as the base track 32 and seat rail 36 of FIG. 2. FIG. 4 is a section view of the modal block 40, base track 32, and seat rail 36. FIGS. 3 and 4 are taken along a longitudinal axis with a left lateral direction 28 and right lateral direction 29 perpendicular to the fore direction 21 and aft direction 22 of FIG. 2.

As shown in FIGS. 3 and 4, the modal block includes a base portion 41 and an upper portion 42. In certain embodiments, a bottom surface of the base portion 41 may be fixed to the base track 32. In certain embodiments, the base portion 41 and the upper portion 42 may be integrally formed, i.e., one-piece. In certain embodiments, the base portion 41 and the upper portion 42 are separately formed and are fixed together. The base portion 41 and the upper portion 42 may be formed from a same material, or may be formed from different materials. Further, the material of the base portion 41 and the material of the upper portion 42 may be selected to have a desired rigidity or flexibility.

As shown, the base portion 41 is located at a height below the seat rail 36. The upper portion 42 of the modal block 40 extends upward from the base portion 41 and is located in a recess 39 between opposite sides of the seat rail 36.

Shoulder portions or bottom projections 43 may extend laterally outward from the base portion 41 and from a lower region of the upper portion 42 to first abutment surfaces 45. As shown, each first abutment surface 45 has a horizontal component, i.e., is not vertical. In other words, each first abutment surface 45 may be horizontal or diagonal. Further, the bottom projections 43 may extend laterally outward from the lower region of the upper portion 42 to second abutment surfaces 46. As shown, the second abutment surfaces 46 may be vertical.

Upper projections 44 may extend laterally outward from the upper portion 42 to upper abutment surfaces 47. As shown, the upper abutment surfaces 47 may be vertical.

As stated above, the modal block 40 may be fixed to the vehicle base track 32. For example, the modal block 40 may be press fit into the vehicle base track 32 and maintained in position by friction, adhered to the vehicle base track 32, mechanically coupled to the vehicle base track 32, or fixed to the vehicle base track 32 in another suitable manner.

Further, the modal block 40 may be designed and formed to selectively contact the seat rail 36 at the first abutment surface 45, second abutment surface 46, and/or upper abutment surface 47 with a desired force. As a result, the stiffness of the seat 30 may be increased, i.e., leeway between the seat 30 and the vehicle base track 32 may be reduced.

More specifically, stiffness of the seat 30 may be increased in the lateral direction 28/29 by applying greater radially outward force from the upper abutment surfaces 47 to the seat rail 36. Stiffness of the seat 30 in the lateral direction 28/29 may be minimized by disconnecting the upper portion 42 of the modal block 40 from the seat rail 36. In other words, the upper portion 42 may not contact the seat rail 36, maximizing leeway therebetween.

Stiffness of the seat 30 may be increased in the longitudinal direction 21/22 by applying greater vertically upward force from the first abutment surfaces 45 to the seat rail 36.

Also, the modal block 40 may have a design and structure configured to decrease the amplitude of the vibration of the seat 30 at a given frequency, i.e., the modal block may dampen the vibration of the seat 30. The dampening effect may be optimized through selection of material of the modal block 40 as well as the shape of the modal block 40. For example, a more flexible material may provide increased dampening as compared to a rigid material. Further, a modal block 40 designed to apply a selected amount of force from a flexible material on the seat rail 36 may provide increased dampening. In order to optimize dampening and stiffness, the modal block 40 may be formed from more flexible material at least one engagement surface and a more rigid material at another engagement surface.

In addition to the adjustment of stiffness and/or dampening provided by the structure of the modal block 40, the location of the modal block 40 and/or an arrangement of a plurality of modal blocks 40 for a single seat 30 may be used to provide the desired stiffness and/or dampening in the lateral and longitudinal directions. For example, while FIG. 1 illustrates a single modal block 40 near the rear end 34 of the vehicle base track 32, the modal block 40 could be positioned near the front end 33. Further, multiple modal blocks 40 could be mounted on the vehicle base track 32. Also, when using multiple modal blocks 40, the design and structure of each modal block 40 may differ. For example, one modal block 40 may provide increased stiffness in the longitudinal direction while another modal block 40 may provide increased stiffness in the lateral direction. Likewise, one modal block 40 may dampen amplitude by desired amount while another modal block 40 may not dampen amplitude. Also, while in certain embodiments, the modal block(s) 40 may be arranged on the vehicle base track 32 on the left side of the seat 30 in the same manner as on the vehicle base track 32 on the right side of the seat 30, in other embodiments, the two vehicle base tracks 32 may be provided with modal blocks 40 of different structures or different arrangements of modal blocks 40.

Figure 5:
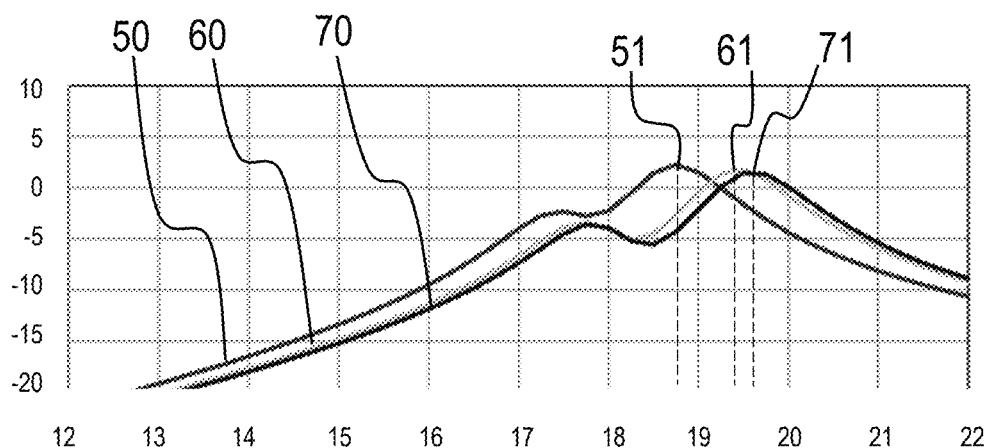
FIGS. 5 and 6 are graphs illustrating the adjustment of the natural frequency of a vehicle seat provided with different modal blocks in the lateral and longitudinal directions.

FIG. 5 is a graph illustrating the frequency (X-axis in Hertz) and amplitude of vibration (Y-axis is defined by the acceleration (dB ref. 1M/s2) for a vehicle seat 30 in the lateral direction when provided with no modal block (50), provided with a modal block having a flexible base portion and a rigid upper portion (60) of a design and shape, and provided with a modal block having a rigid base portion and a rigid upper portion (70) of the same design and shape.

As shown, the vehicle seat 30 with no modal block (50) has a natural frequency 51 in the lateral direction of 18.70 Hz. When outfitted with the modal block having a flexible base portion and a rigid upper portion, the vehicle seat 30 has an adjusted natural frequency 61 in the lateral direction of 19.38 Hz. When outfitted with the modal block having a rigid base portion and a rigid upper portion, the vehicle seat 30 has an adjusted natural frequency 71 in the lateral direction of 19.54 Hz.

Figure 6:
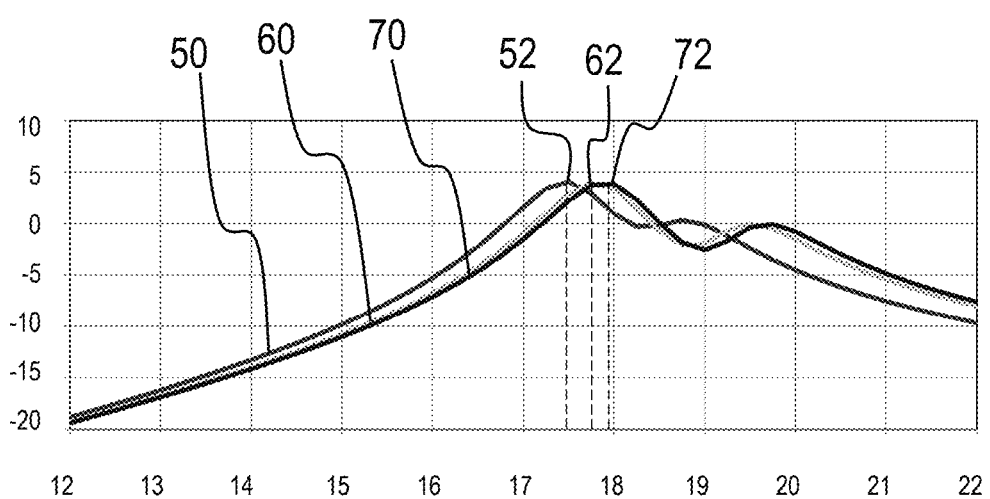

FIG. 6 is a graph illustrating the frequency (X-axis in Hertz) and amplitude of vibration (Y-axis is defined by the acceleration (dB ref. 1M/s2) in the longitudinal direction for the same vehicle seat 30 and modal block 40 arrangements of FIG. 5, i.e., no modal block (50), a modal block having a flexible base portion and a rigid upper portion (60) of a design and shape, and a modal block having a rigid base portion and a rigid upper portion (70) of the same design and shape. As shown, the vehicle seat 30 with no modal block (50) has a natural frequency 52 in the longitudinal direction of 17.49 Hz. When outfitted with the modal block having a flexible base portion and a rigid upper portion (60), the vehicle seat 30 has an adjusted natural frequency 62 in the longitudinal direction of 17.83 Hz. When outfitted with the modal block having a rigid base portion and a rigid upper portion (70), the vehicle seat 30 has an adjusted natural frequency 72 in the longitudinal direction of 17.93 Hz.

Thus, the natural frequency of a vehicle seat 30 may be adjusted to a selected frequency in the lateral and longitudinal directions through the design, structure, shape and material selection.

Figure 7:
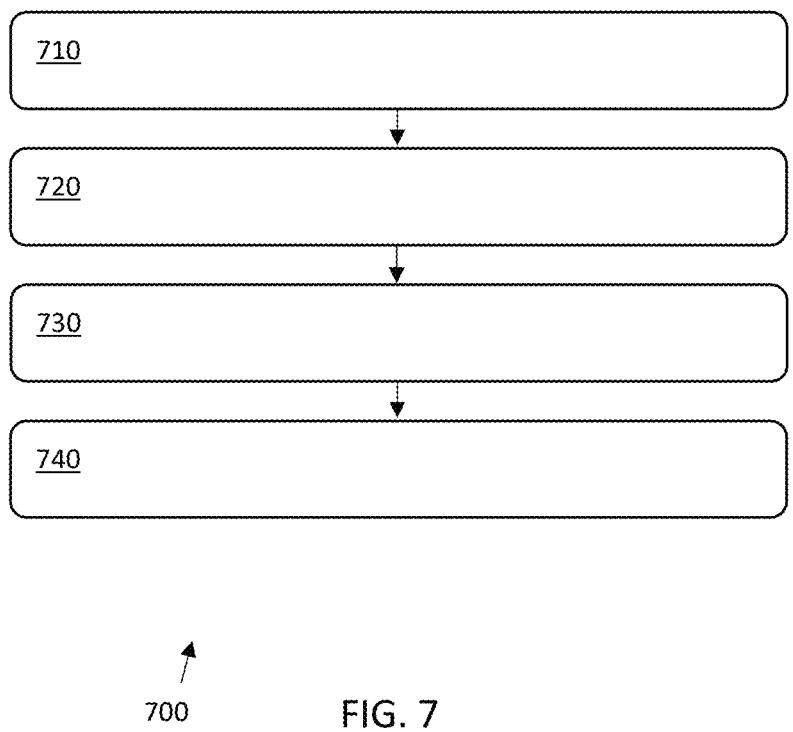
FIG. 7 is a flow chart of a method for manufacturing a modal block for use with a vehicle seat in a vehicle.

Referring now to FIG. 7, a method 700 for manufacturing a modal block 40 for use with a vehicle seat 30 is provided. The method 700 includes, at operation 710, identifying a frequency range of output frequencies of the vehicle. For example, operation of a vehicle may be observed and various output frequencies may be recorded. Output frequencies may originate at an engine, such as an internal combustion engine, from tires contacting a road surface, or from other vehicle components. Alternatively, a processor may model anticipated output frequencies given inputs related to a specific vehicle model. The processor may utilize or include any hardware, software, firmware, electronic control unit or component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Further, the processor may be realized by any number of hardware, software, and/or firmware components configured to perform the specified functions. For example, an embodiment of the processor may employ various integrated circuit components. e.g., memory elements, digital signal processing elements, logic elements, look-up tables, or the like, which may carry out a variety of functions.

Method 700 may continue at operation 720 with determining a natural frequency of the vehicle seat 30. For example, the processor may model a vehicle seat provided with a seat rail, vehicle base track and seat mechanism. In certain embodiments, method 700) includes mounting a vehicle base track to the vehicle and coupling a seat rail to the vehicle seat, such that determining the natural frequency of the vehicle seat 30 is based in part on the freeplay of the seat rail in the vehicle base track.

Method 700 includes, at operation 730, designing a modal block configured to adjust the natural frequency of the vehicle seat. For example, in certain embodiments, the natural frequency of the vehicle seat is within the frequency range of output frequencies of the vehicle. In such embodiments, the modal block is designed by the processor to adjust the natural frequency of the vehicle seat to an adjusted natural frequency outside of the frequency range. For example, the modal block may be designed to increase the natural frequency of the vehicle seat to an increased natural frequency greater than the frequency range. Alternatively or additionally, the modal block may be designed to decrease an amplitude of vibration of the vehicle seat at the natural frequency and/or at the adjusted natural frequency. Also, the modal block may be designed to change the mode shape of the vehicle seat.

Method 700 may continue at operation 740 with locating the modal block between the vehicle and the vehicle seat to adjust the natural frequency of the vehicle seat. For example, the modal block (or blocks) may be fixed to the vehicle base track between the vehicle base track and the seat rail to allow longitudinal movement of the seat rail with respect to the modal block and vehicle base track when a user adjusts the position of the vehicle seat.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for manufacturing a modal block for use with a vehicle seat in a vehicle, the method comprising:
   identifying a frequency range of output frequencies of the vehicle;
   determining a natural frequency of the vehicle seat;
   designing a modal block configured to adjust the natural frequency of the vehicle seat; and
   locating the modal block between the vehicle and the vehicle seat to adjust the natural frequency of the vehicle seat.

2. The method of claim 1, further comprising:
   mounting a vehicle base track to the vehicle, wherein interconnecting the modal block between the vehicle and the vehicle seat comprises disposing the modal block between the vehicle base track and the vehicle seat.

3. The method of claim 2 further comprising:
   coupling a seat rail to the vehicle seat, wherein interconnecting the modal block between the vehicle and the vehicle seat comprises disposing the modal block between the vehicle base track and the seat rail.

4. The method of claim 3 wherein the seat rail is configured to slide in a longitudinal direction between fixed positions with respect to the vehicle base track, and wherein the modal block is fixed in position on the vehicle base track.

5. The method of claim 1 wherein, when the natural frequency is within the frequency range, designing the modal block configured to adjust the natural frequency of the vehicle seat comprises adjusting the natural frequency of the vehicle seat to an adjusted natural frequency outside of the frequency range.

6. The method of claim 1 wherein, when the natural frequency is within the frequency range, designing the modal block configured to adjust the natural frequency of the vehicle seat comprises increasing the natural frequency of the vehicle seat to an increased natural frequency outside of the frequency range.

7. The method of claim 1 wherein designing the modal block configured to adjust the natural frequency of the vehicle seat comprises decreasing an amplitude at the natural frequency.

8. The method of claim 1 wherein designing the modal block configured to adjust the natural frequency of the vehicle seat comprises changing a mode shape of the vehicle seat.

9. A vehicle seat arrangement comprising:
   a vehicle seat;
   a vehicle base track;
   a seat rail mounted to the vehicle seat and configured for movement with respect to the vehicle base track; and
   a modal block disposed between the vehicle base track and the seat rail, wherein the modal block is configured to adjust a natural frequency of the vehicle seat arrangement.

10. The vehicle seat arrangement of claim 9, wherein the modal block is configured to increase the natural frequency of the vehicle seat arrangement to a desired adjusted natural frequency.

11. The vehicle seat arrangement of claim 9, wherein the modal block is configured to increase the natural frequency of the vehicle seat arrangement in a longitudinal direction.

12. The vehicle seat arrangement of claim 9, wherein the modal block is configured to increase the natural frequency of the vehicle seat arrangement in a lateral direction.

13. The vehicle seat arrangement of claim 9, wherein the modal block is configured to dampen vibration of the vehicle seat arrangement.

14. The vehicle seat arrangement of claim 9, wherein the modal block comprises:
   a base disposed on a bottom portion of the vehicle base track;
   a shoulder portion located above the base and having a surface located under the seat rail; and
   an upper portion located inside the seat rail.

15. The vehicle seat arrangement of claim 14, wherein the shoulder portion contacts the seat rail and is configured to increase the natural frequency of the vehicle seat arrangement in a longitudinal direction.

16. The vehicle seat arrangement of claim 14, wherein the upper portion is formed with outward extending projections that contact the seat rail and are configured to increase the natural frequency of the vehicle seat arrangement in a lateral direction.

17. The vehicle seat arrangement of claim 14, wherein the modal block is fixed in position, and wherein the vehicle seat and seat rail are configured for movement in a longitudinal direction to adjust a location of the vehicle seat.

18. A vehicle comprising:
- a vehicle body;
- a vehicle base track coupled to the vehicle body;
- a seat rail mounted to a seat and configured for movement with respect to the vehicle base track; and
- a modal block disposed between the vehicle base track and the seat rail, wherein the modal block is configured to adjust a natural frequency of the seat.

19. The vehicle of claim 18, wherein the modal block comprises:
- a base disposed on a bottom portion of the vehicle base track;
- a shoulder portion located above the base and having a surface located under the seat rail; and
- an upper portion located inside the seat rail.

20. The vehicle of claim 19, wherein:
- the shoulder portion contacts the seat rail and is configured to increase the natural frequency of the seat in a longitudinal direction; and
- the upper portion is formed with outward extending projections that contact the seat rail and are configured to increase the natural frequency of the seat in a lateral direction.

* * * * *